US011132507B2

(12) United States Patent
Park et al.

(10) Patent No.: US 11,132,507 B2
(45) Date of Patent: Sep. 28, 2021

(54) CROSS-SUBJECT MODEL-GENERATED TRAINING DATA FOR RELATION EXTRACTION MODELING

(71) Applicant: International Business Machines Corporation, Armonk, NY (US)

(72) Inventors: Youngja Park, Princeton, NJ (US); Taesung Lee, Ridgefield, CT (US); Arpita Roy, Halethorpe, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/372,497

(22) Filed: Apr. 2, 2019

(65) Prior Publication Data

US 2020/0320171 A1    Oct. 8, 2020

(51) Int. Cl.
*G06F 40/279* (2020.01)
*G06N 3/04* (2006.01)
(Continued)

(52) U.S. Cl.
CPC .......... *G06F 40/279* (2020.01); *G06F 40/169* (2020.01); *G06K 9/6257* (2013.01); *G06N 3/049* (2013.01); *G06N 7/005* (2013.01)

(58) Field of Classification Search
None
See application file for complete search history.

(56) References Cited

U.S. PATENT DOCUMENTS 8,131,756 B2 *   3/2012   Cams ...................... G06F 16/36
                                                              707/776
8,725,666 B2 *   5/2014   Lemmond ........... G06F 16/3344
                                                              706/13
(Continued)

OTHER PUBLICATIONS

Stanovsky G, Michael J, Zettlemoyer L, Dagan I. Supervised open information extraction. InProceedings of the 2018 Conference of the North American Chapter of the Association for Computational Linguistics: Human Language Technologies, vol. 1 (Long Papers) Jun. 2018 (pp. 885-895) (Year: 2018).*

(Continued)

*Primary Examiner* — Jonathan C Kim
(74) *Attorney, Agent, or Firm* — Garg Law Firm, PLLC; Rakesh Garg; Anthony Curro (57) ABSTRACT

A first vector representation of a first word within a first narrative text and a machine-generated label corresponding to the first word are constructed. Using the first vector representation, an annotator model is trained. The annotator model is configured to produce a set of probabilities, each probability in the set of probabilities representing a probable output annotation corresponding to a word within a narrative text. The training includes minimizing a difference between a first human-generated label corresponding to the first word and a first probable output annotation corresponding to the first word. Using the trained annotator model and a second narrative text, second training data is generated. The trained annotator model is configured to produce an output annotation corresponding to a word within a narrative text. The second training data is usable to train a relation extraction model.

18 Claims, 9 Drawing Sheets

(51) Int. Cl.
    *G06N 7/00*    (2006.01)
    *G06K 9/62*    (2006.01)
    *G06F 40/169*  (2020.01)

(56) References Cited

U.S. PATENT DOCUMENTS

| | | | | |
|---|---|---|---|---|
| 8,938,410 | B2 | 1/2015 | Cafarella et al. | |
| 9,317,569 | B2 | 4/2016 | Nie et al. | |
| 10,002,129 | B1 | 6/2018 | D'Souza | |
| 10,599,700 | B2* | 3/2020 | Davulcu | G06F 40/247 |
| 2008/0243479 | A1* | 10/2008 | Cafarella | G06F 16/338 |
| | | | | 704/9 |
| 2010/0293451 | A1* | 11/2010 | Carus | G06F 16/36 |
| | | | | 715/230 |
| 2011/0213742 | A1* | 9/2011 | Lemmond | G06F 16/3344 |
| | | | | 706/13 |
| 2013/0066903 | A1* | 3/2013 | Tymoshenko | G06F 19/00 |
| | | | | 707/769 |
| 2014/0156264 | A1 | 6/2014 | Etzioni et al. | |
| 2014/0297264 | A1* | 10/2014 | Etzioni | G06F 40/205 |
| | | | | 704/9 |
| 2015/0370782 | A1* | 12/2015 | Fan | G06F 40/211 |
| | | | | 704/9 |
| 2016/0125013 | A1* | 5/2016 | Barborak | G06F 16/24578 |
| | | | | 707/748 |
| 2016/0259774 | A1* | 9/2016 | Miura | G06F 40/205 |
| 2018/0082183 | A1 | 3/2018 | Hertz et al. | |

OTHER PUBLICATIONS

Roy, Arpita, et al. "Supervising unsupervised open information extraction models." Proceedings of the 2019 Conference on Empirical Methods in Natural Language Processing and the 9th International Joint Conference on Natural Language Processing (EMNLP-IJCNLP). 2019. (Year: 2019).*

Etzioni et al., Open Information Extraction: the Second Generation, Department of Computer Science and Engineering University of Washington, Jul. 16, 2011.

Gabor Angeli et al., Leveraging Linguistic Structure for Open Domain Information Extracion, Department of Computer Science Stanford University, Jul. 2015.

Sheng Zhang et al., MT/IE: Cross-lingual Open Information Extraction with Neural Sequence-to-Sequence Models, Johns Hopkins University, Apr. 3, 2017.

Gabriel Stanovsky et al., Supervised Open Information Extraction, Bar-Ilan University Computer Science Department, Paul G. Allen School of Computer Science & Engineering, University of Washington, Allen Institute for Artificial Intelligence, Jun. 1, 2016.

Mingming Sun et al., Logician: A Unified End-to-End Neural Approach for Open-Domain Information Extraction, WSDM'18, Feb. 5, 2018.

Cui et al., Neural Open Information Extraction, arXiv:1805.04270v1 [cs.CL] May 11, 2018.

Jia et al., Supervised Neural Models Revitalize the Open Relation Extraction, arXiv:1809.09408v1 [cs.AI] Sep. 25, 2018.

* cited by examiner

SENTENCE 810

ALPHA CORP HAS RELEASED A NEW IMPROVED VERSION OF THE BANKIT APPLICATION THAT RUNS ON THE OMEGA SYSTEM.

ANNOTATED SENTENCE 820

| ALPHA | CORP | HAS | RELEASED | A | NEW | IMPROVED | VERSION | OF | THE | BANKIT | APPLICATION |
|---|---|---|---|---|---|---|---|---|---|---|---|
| E | E | R | R | E | E | E | E | E | E | E | E |

| THAT | RUNS | ON | THE | OMEGA | SYSTEM |
|---|---|---|---|---|---|
| O | O | O | O | O | O |

ANNOTATED SENTENCE 830

| ALPHA | CORP | HAS | RELEASED | A | NEW | IMPROVED | VERSION | OF | THE | BANKIT | APPLICATION |
|---|---|---|---|---|---|---|---|---|---|---|---|
| O | O | O | O | E | E | E | E | E | E | E | E |

| THAT | RUNS | ON | THE | OMEGA | SYSTEM |
|---|---|---|---|---|---|
| O | R | R | E | E | E |

FIGURE 9

CROSS-SUBJECT MODEL-GENERATED TRAINING DATA FOR RELATION EXTRACTION MODELING

TECHNICAL FIELD

The present invention relates generally to a method, system, and computer program product for generating training data for a natural language processing model. More particularly, the present invention relates to a method, system, and computer program product for cross-subject model-generated training data for relation extraction modeling.

BACKGROUND

Information extraction (IE), a technique used in natural language processing (NLP), refers to the extraction of structured information from a document in narrative text form. Once the structured information is created, it can be used for end-user applications such as structured search, as well as the basis for more complex tasks such as knowledge-base construction, question answering, semantic role labeling, and other NLP tasks. For example, information extraction can be used to extract all the companies named in a collection of financial news articles, all the named medical conditions from patient medical records, or all the instances of a particular part of speech in a corpus of text documents on a variety of subjects. Although examples herein are taken from the English language and refer to grammar features of English, the techniques disclosed herein are applicable to natural languages other than English.

Relation extraction is a type of information extraction. In particular, relation extraction is the identification of relations, or relationships, between entities, as described in narrative text. An entity can be a person, organization, place, thing, name, or other noun or noun phrase. For example, "Paris is the capital of France" expresses the relation capital (France, Paris), where capital( ) is the relation and France and Paris are entities related by the capital( ) relation. Similarly, "Jill is in France" expresses the relation location (Jill, France). As another example, "ABC Corp. and XYZ Inc. have announced plans to merge, with a closing date in the third quarter of this year" expresses the relation merger (ABC Corp., XYZ Inc.). A user can specify a particular relation to be extracted—for example, all of the week's merger announcements from a corpus of corporate press releases. Alternatively, relation extraction can also be used to learn which relations are expressed within a corpus or document and extract one or more of those relations.

Two types of machine learning methods presently perform relation extraction: supervised-learning and rule-based. In a prior-art supervised-learning method, a human expert generates training data by annotating a corpus of narrative text documents. Annotation, as used herein, is the process of labeling data. Thus, in a supervised method, annotation for relation extraction comprises labeling words or phrases as entitles and relations and, optionally, classifying entities and relations into types. Then the human-annotated training data is used to train a machine learning model to produce labels and classifications similar to those in the training data.

Prior-art rule-based methods do not rely on human-annotated training data. Instead, a model, implemented as a software application, parses sentences using a set of rules. For example, one sample rule could be that if a sentence includes "merge" or "merger", and other words in the sentence match words in a database of publicly traded companies, this sentence likely expresses a merger( ) relation between the named entities.

SUMMARY

The illustrative embodiments provide a method, system, and computer program product. An embodiment includes a method that constructs a first vector representation of a first word within a first narrative text and a machine-generated label corresponding to the first word. An embodiment trains, using the first vector representation, an annotator model, the annotator model configured to produce a set of probabilities, each probability in the set of probabilities representing a probable output annotation corresponding to a word within a narrative text, the training comprising minimizing a difference between a first human-generated label corresponding to the first word and a first probable output annotation corresponding to the first word. An embodiment generating, using the trained annotator model and a second narrative text, second training data, the trained annotator model configured to produce an output annotation corresponding to a word within a narrative text, the second training data being usable to train a relation extraction model.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that both—prior-art supervised-learning and rule-based relation extraction methods—suffer from disadvantages. Human experts must generate training data for supervised learning, which can be time consuming, subjective, inaccurate, and expensive. Human experts may generate data inconsistently over time and inconsistently from each other. Human experts may also generate incorrect data, due to incorrect or incomplete understanding of the annotation task. A model trained using consistently incorrect data will produce incorrect results. A model trained using inconsistent data may take longer to train or may not produce consistently correct results. Furthermore, human-generated training data has to be planned and prepared a significant amount of time ahead of the model's runtime. A model trained on predetermined fixed training data may respond adequately to similar data at runtime but may exhibit undesirable performance with data of significant dissimilarity. For humans to prepare the training data, the amount of lead-time required makes it very difficult, if not impossible, to perform rapid training for highly dissimilar previously unseen data.

Rule-based methods do not require annotated training data. However, rule-based methods require a comprehensive set of rules. If the rule set is insufficiently comprehensive, the results of relation extraction using that rule set can also be insufficiently comprehensive. For example, if a rule set omits a rule for a common synonym of a relation (e.g., "join" for "merge"), text expressing that relation will not be included in the structured information for a document or corpus.

Furthermore, as with supervised learning, rule-based training has to be planned and prepared ahead of the model's runtime. A model trained on predetermined fixed rules may respond adequately to anticipated data at runtime but may exhibit undesirable performance with data of unexpected characteristics. Pre-configuration of rules makes it very difficult, if not impossible, to perform rapid model training for data with unexpected characteristics.

The illustrative embodiments recognize that a model, developed using either type of method, is specific to a particular knowledge domain. Training data for a model using a supervised-learning method must be similar to the data the model will process once trained. For example, a model trained using annotated geographical data, such as the capitals of various countries, will not be able to extract merger announcements from a database of corporate press releases. Similarly, a rule-based model that includes rules for parsing geographical data will not include rules that are applicable for processing the financial information in corporate press releases.

Consequently, the illustrative embodiments recognize that there is a need for automated generation of annotations for use as training data. The automated annotation generation should minimize a necessity for human-annotated training data in a knowledge domain, make use of an existing rule-based system in the same knowledge domain, and be usable, once trained, to generate annotations that apply to a different knowledge domain.

The illustrative embodiments recognize that the presently available tools or solutions do not address these needs or provide adequate solutions for these needs. The illustrative embodiments used to describe the invention generally address and solve the above-described problems and other problems related to cross-subject model-generated training data for relation extraction modeling.

An embodiment can be implemented as a software application. The application implementing an embodiment can be configured as a modification of an existing NLP system, as a separate application that operates in conjunction with an existing NLP system, a standalone application, or some combination thereof.

Particularly, some illustrative embodiments provide a method by which annotation data specific to one knowledge domain can be automatically generated using a model trained using a small amount of human-annotated training data and one or more existing rule-based systems from a different knowledge domain.

An embodiment constructs a set of training data. The training data includes a received unit of narrative text. A unit of narrative text can be a portion of a word (e.g. a root portion of a word, a plural noun with a final 's' removed), a word, a phrase, a sentence, a group of sentences, or another unit of narrative text according to the grammar of the language of the narrative text. Unless expressly disambiguated, the term word as used herein refers to the smallest unit of narrative text in a given language that is assigned an annotation. The term word may include more than one natural language word, or only a portion of a natural language word. Similarly, unless expressly disambiguated the term sentence, as used herein, refers to a portion of narrative text that includes one or more words according to the grammar of the language of the narrative text. The term sentence, as used herein, may actually include only a portion of a natural language sentence, or more than one natural language sentence.

The training data also includes a received, human-generated label corresponding to the unit of narrative text. In an embodiment, a human-generated label is one of E, R, and O. E labels a unit of narrative text as an entity, R labels a unit of narrative text as a relation, and O labels a unit of narrative text as other—i.e., not an entity or a relation. However, other labeling schemes, using other combinations of labels representing other types of units of narrative text, are also possible and usable by the illustrative embodiments.

The training data also includes one or more machine-generated labels corresponding to the unit of narrative text. To produce machine-generated labels, an embodiment applies the unit of narrative text to the inputs of one or more prior-art rule-based relation extraction models. If an embodiment uses more than one model, each model recognizes relations based on a set of common patterns and a set of elements or patterns that are different for different models.

In one embodiment that uses more than one model, the machine-generated labels that are generated by a majority of the models are added to the training data. In another embodiment that uses more than one model, the machine-generated labels that are generated by each model are added to the training data. Other schemes to aggregate the results from more than one model are also possible and contemplated within the scope of the illustrative embodiments. Using training data generated by a variety of models, instead of by only one model, results in a trained model that includes the best features of each rule-based model.

An embodiment generates an overall vector representation corresponding to the unit of narrative text. A vector, also called an embedding, is a representation of a unit of narrative text or a label or annotation corresponding to a unit of narrative text. A vector is an array of real numbers, typically between zero and one, but not limited thereto. The array has a large number of dimensions—for example, 300. However, as long as the vector range and number of dimensions are consistent when using a particular model, the exact range and number of dimensions are unimportant. To generate a vector representation, an embodiment uses any suitable prior-art technique—for example, a previously-trained neural network.

One or more components, each also vector representations, make up the overall vector representation. One embodiment uses, as a component, a vector representation of the unit of narrative text. Another embodiment uses, as a component, a vector representation of a part of speech (e.g. a noun, verb, adjective, adverb, or another part of speech) corresponding to the unit of narrative text. Another embodiment uses, as a component, a vector representation of a syntactic role corresponding to the unit of narrative text. A syntactic role is a role played by a unit of narrative text within a sentence. For example, a noun can have a syntactic role of subject, direct object, or indirect object within a sentence. Another embodiment uses, as a component, a vector representation of a machine-generated label (e.g. E, R, 0 in one labeling scheme) corresponding to the unit of narrative text. Another embodiment uses, as a component, a vector representation of each machine-generated label, concatenated together, corresponding to the unit of narrative text. Another embodiment uses, as a component, a vector representation of a context of the unit of narrative text. An embodiment using more than one component uses, as the overall vector representation, a vector concatenation of each component.

An embodiment uses the training data to train an annotator model. An annotator model is a neural network that takes as input an overall vector representation of a unit of narrative text and produces, as an output, a label, or annotation, corresponding to the input unit of narrative test. In particular, in an embodiment an annotator model configured to produce training data for relation extraction produces an annotation identifying the input unit of narrative test as an entity (E), relation (R), or other (O) (i.e., not an entity or a relation).

In an embodiment, training is done sentence by sentence. A vector representation corresponding to each word within a sentence is an input to a column of a neural network. The input vector includes one or more components, concatenated together. In one embodiment the input vector includes a vector representation of a word (a word embedding), a vector representation of a part of speech of the word (a part of speech, or POS, embedding), a vector representation of a syntactic role of the word, and a vector representation of one or more machine-generated labels for the word. The input vector feeds into a forward long short-term memory (LSTM), an artificial recurrent neural network. The output of the forward LSTM feeds into an adjacent forward LSTM to take context into account when assessing an adjacent word in an input sentence.

The output of the forward LSTM also feeds into a softmax function. A softmax function takes as input a vector of real numbers, some of which might be negative, might be greater than one, or might not sum to one, and converts the vector into a vector of real numbers, each between zero and one, that sums to one. In an embodiment, the output of the softmax function is a set of probabilities, each probability corresponding to a likelihood that the input word is functioning as an entity, relation, or neither within the input sentence.

The input vector also feeds into a backward LSTM. The output of the backward LSTM feeds into an adjacent backward LSTM to take context into account when assessing an adjacent word in an input sentence. The output of the backward LSTM also feeds into the softmax function.

During the training process, an embodiment compares the set of output probabilities to the human-generated label corresponding to the same unit of narrative text. In each iteration of the training process, the embodiment adjusts weights within the annotator model so as to minimize the difference between the model output and the human-generated label, for each unit of narrative text within the training data. An embodiment continues the training for a fixed number of iterations. Another embodiment continues the training until model performance exceeds a predetermined threshold. When training ends, the model is considered to be trained.

Once an embodiment has trained the annotator model, an embodiment uses the trained model to generate, from a second corpus of narrative text, a second set of training data. The second set of training data is suitable for training a second model to perform relation extraction.

In particular, to use the trained model, an embodiment constructs an input vector to the trained model in the same manner as described herein for training the model. The embodiment applies the input vector to the trained model, which produces a set of probabilities, each probability corresponding to a likelihood that the input word is functioning as an entity, relation, or neither within the input sentence. An embodiment uses the highest probability as the label for the input word, providing the highest probability output is also above a predefined threshold.

For example, consider the sentence, "Alpha Corp has released a new improved version of the BankIt application that runs on the Omega system." A trained annotator model identifies "has released" as a relation within the sentence and labels each word of the phrase with an R, for relation. The trained model determines that the relation operates on two entities, "Alpha Corp" and "a new improved version of the BankIt application". Accordingly, the trained model labels each word of each entity phrase with an E, for entity. Because the remainder of the words within the sentence do not participate in the relation, the trained model labels each remaining word of the sentence with an O, for other.

For the same example sentence, a trained annotator model also identifies a different relation—"runs on". Accordingly, the trained model labels each word of the relation phrase with an R. The trained model determines that this relation operates on two entities, "a new improved version of the BankIt application" and "the Omega system". Accordingly, the trained model labels each word of each entity phrase with an E. Because the remainder of the words within the sentence do not participate in the relation, the trained model labels each remaining word of the sentence with an O, for other.

Once an embodiment has trained an annotator model using a first set of training data from narrative text in one knowledge domain, the trained model is usable to generate a second set of training data using a corpus from a different knowledge domain. For example, an annotator model trained using training data relating to financial announcements could then be used to generate a new set of annotations for narrative text of medical reports. As a result, the annotator model need not be retrained before generating training data for a new knowledge domain.

The manner of cross-subject model-generated training data for relation extraction modeling described herein is unavailable in the presently available methods in the technological field of endeavor pertaining to models for relation extraction. A method of an embodiment described herein, when implemented to execute on a device or data processing system, comprises substantial advancement of the functionality of that device or data processing system in using machine-generated training data to train an annotator model. Once trained using narrative text from one knowledge domain, the annotator model can produce training data, in a different knowledge domain, for a relation extraction model.

The illustrative embodiments are described with respect to certain types of words, partial words, clauses, sentences, units of narrative text, parts of speech, contexts, vectors, embeddings, models, neural networks, thresholds, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
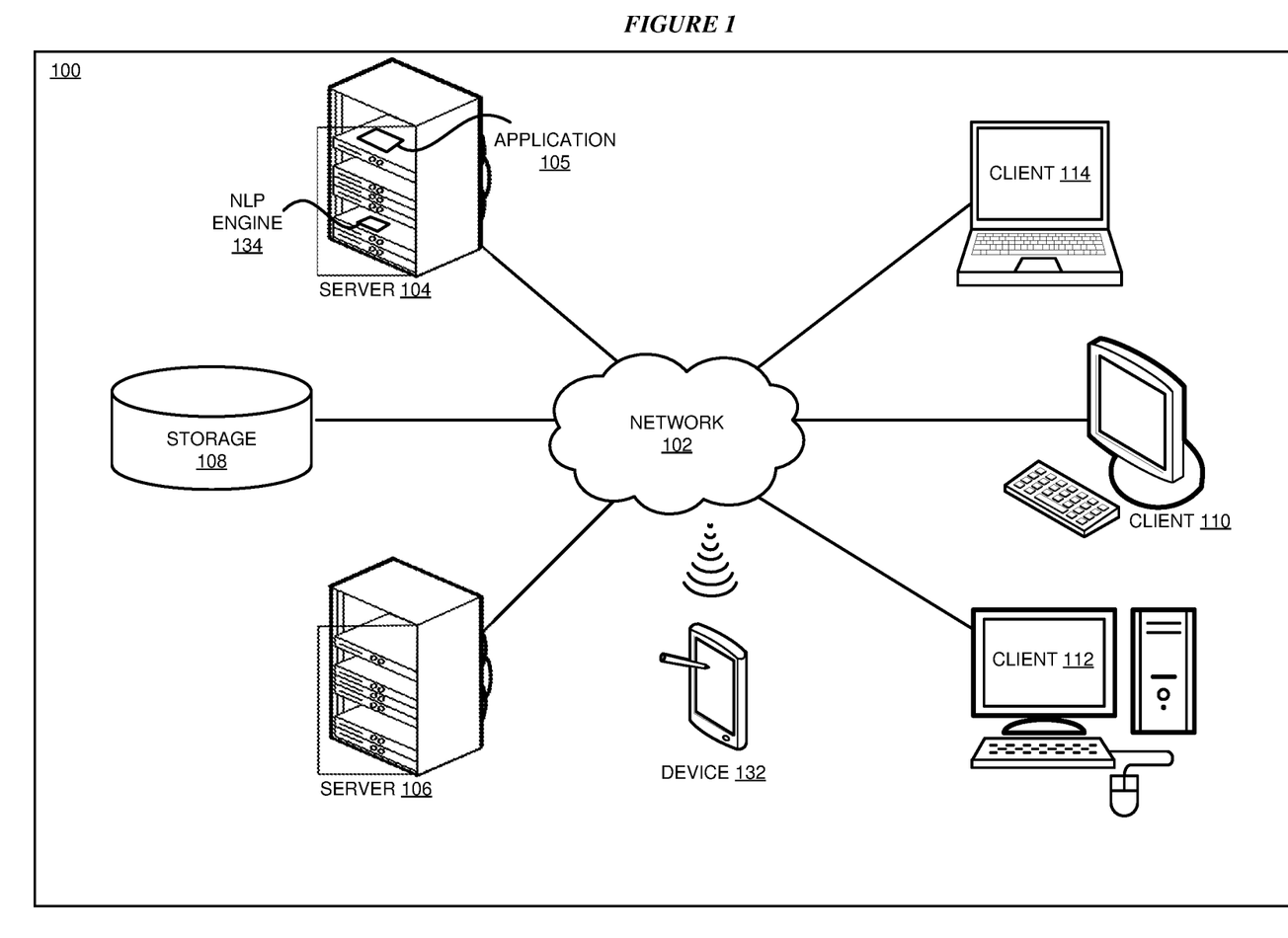
FIG. 1 depicts a block diagram of a network of data processing systems in which illustrative embodiments may be implemented.
Figure 2:
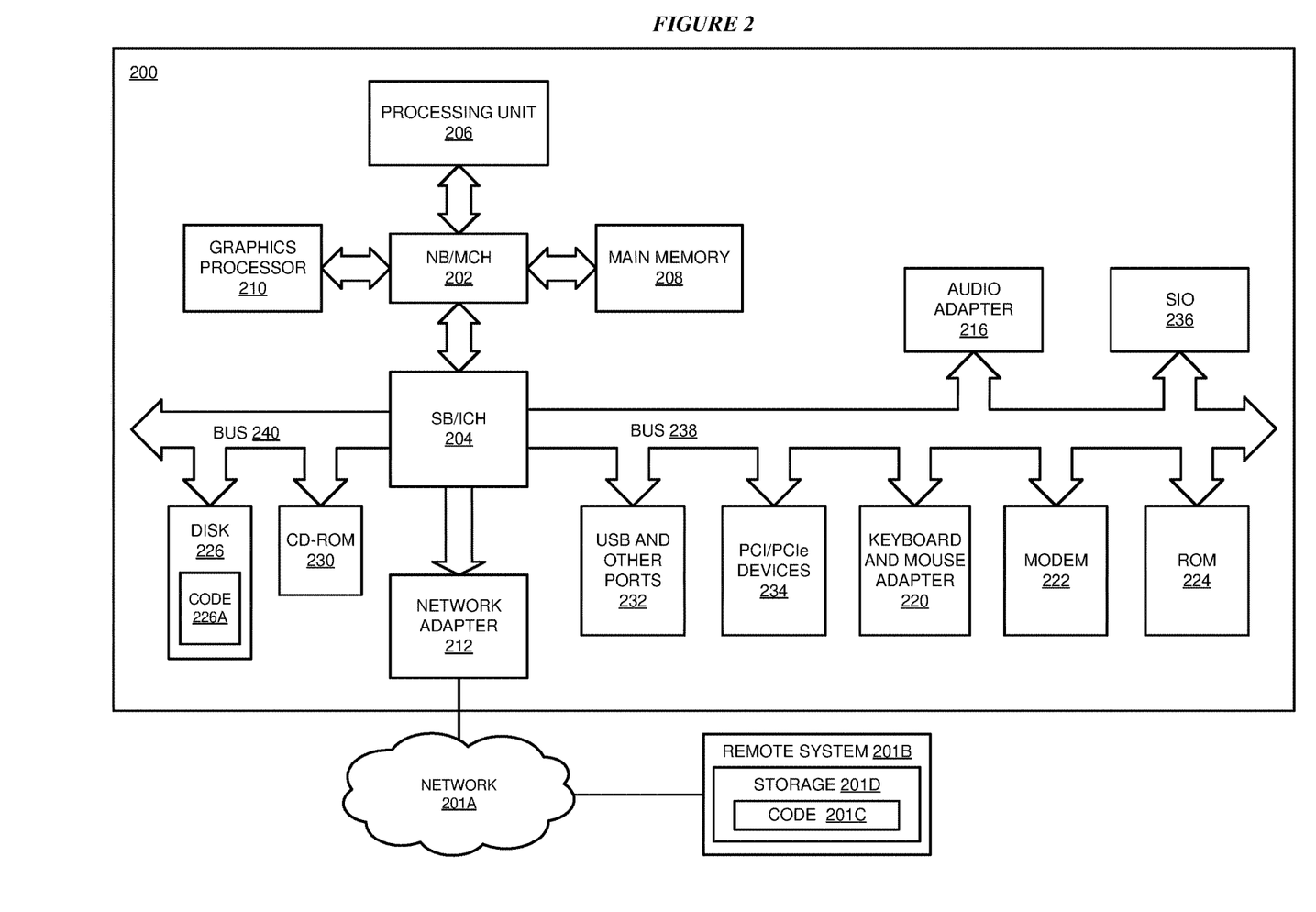
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 makes use of NLP engine 134 to perform NLP-related tasks in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
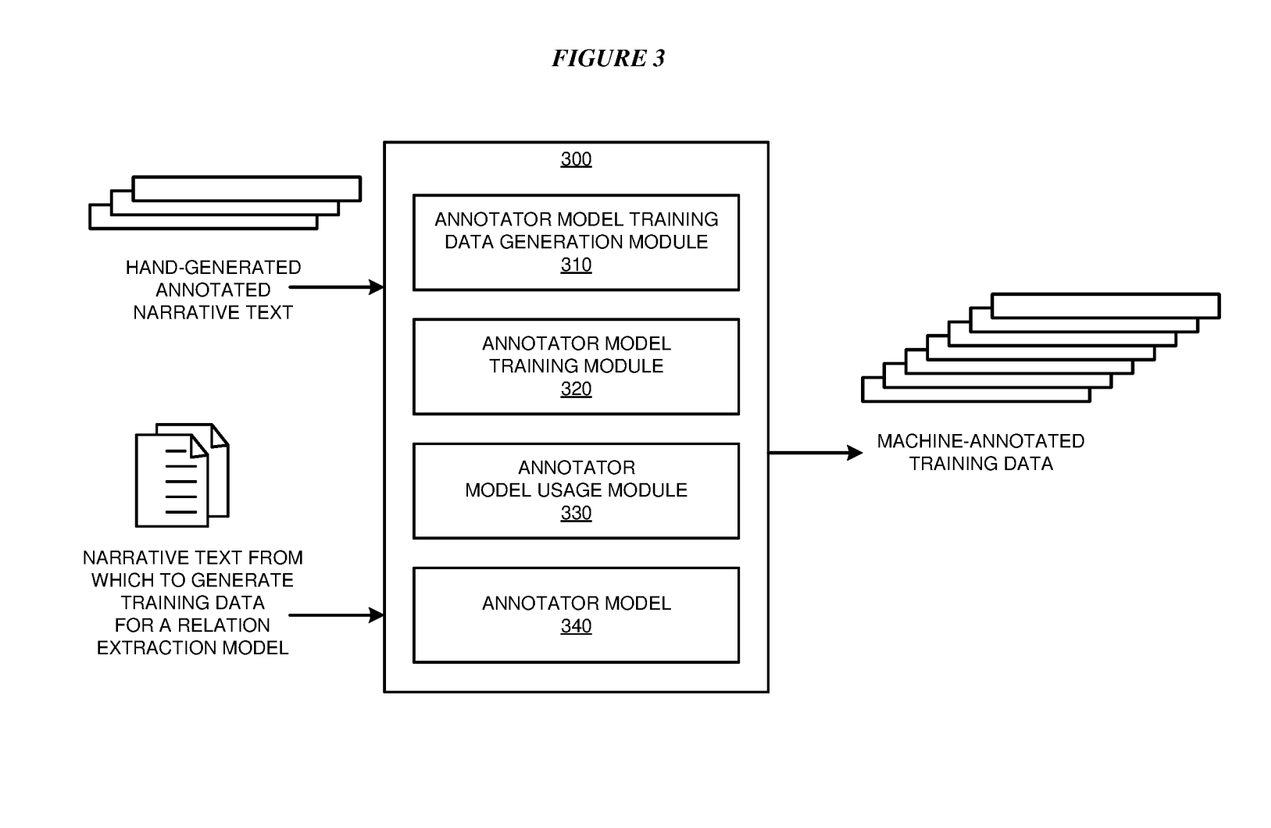
FIG. 3 depicts a block diagram of an example configuration for cross-subject model-generated training data for relation extraction modeling in accordance with an illustrative embodiment.

With reference to FIG. 3, this figure depicts a block diagram of an example configuration for cross-subject model-generated training data for relation extraction modeling in accordance with an illustrative embodiment. Application 300 is an example of application 105 in FIG. 1 and executes in any of servers 104 and 106, clients 110, 112, and 114, and device 132 in FIG. 1.

Annotator model training data generation module 310 constructs a set of training data. The training data includes a received sentence of narrative text. For a unit of narrative text, such as a word within the sentence, the training data also includes a received, human-generated label corresponding to the unit of narrative text. In one labeling scheme, a human-generated label is one of E, R, and O. E labels a unit of narrative text as an entity, R labels a unit of narrative text as a relation, and O labels a unit of narrative text as an other—i.e., not an entity or a relation. Module 310 also generates a machine-generated label corresponding to the unit of narrative text.

Annotator model training module 320 trains annotator model 340. Once annotator model 340 has been trained, annotator model usage module 330 uses annotator model 340 to generate training data with which to train a relation extraction model to perform relation extractions.

Figure 4:
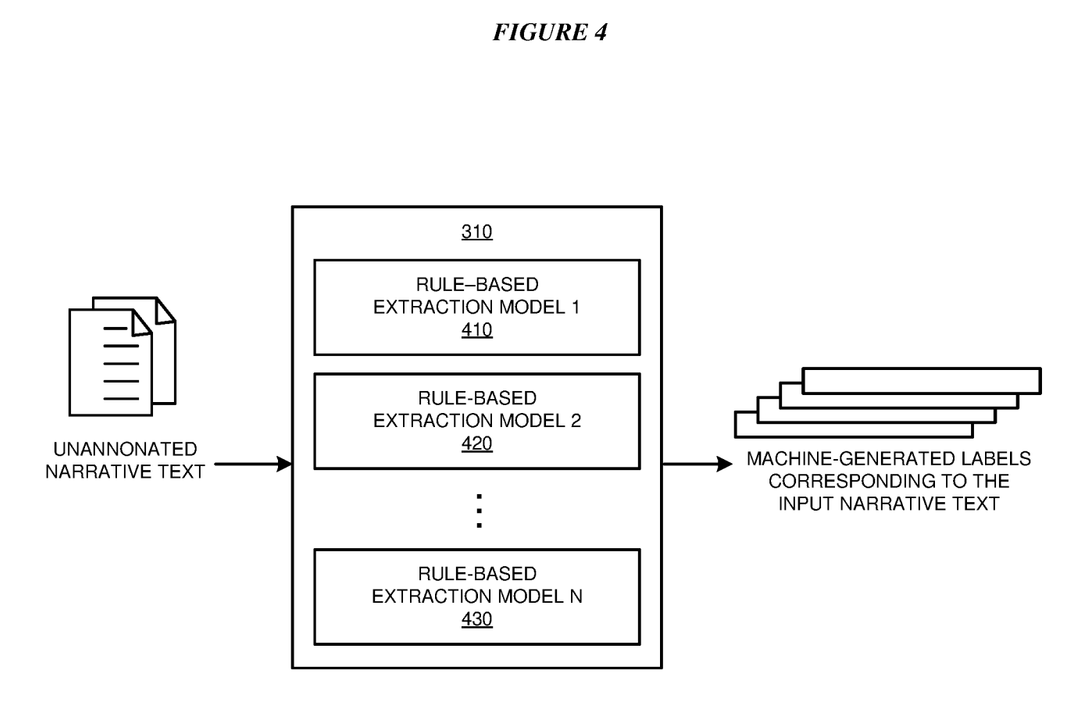
FIG. 4 depicts more detail of an example configuration for cross-subject model-generated training data for relation extraction modeling in accordance with an illustrative embodiment.

With reference to FIG. 4, this figure depicts more detail of an example configuration for cross-subject model-generated training data for relation extraction modeling in accordance with an illustrative embodiment. In particular, FIG. 4 depicts more detail of module 310 in FIG. 3.

Module 310 applies the unit of narrative text to the inputs of a set of rule-based relation extraction models, such as rule-based relation extraction model 410, rule-based relation extraction model 420, and rule-based relation extraction model 430. Each model includes rules that recognize relations based on different elements or patterns. Module 310 uses, as the machine-generated label added to the training data, the results generated by all of the models.

Figure 5:
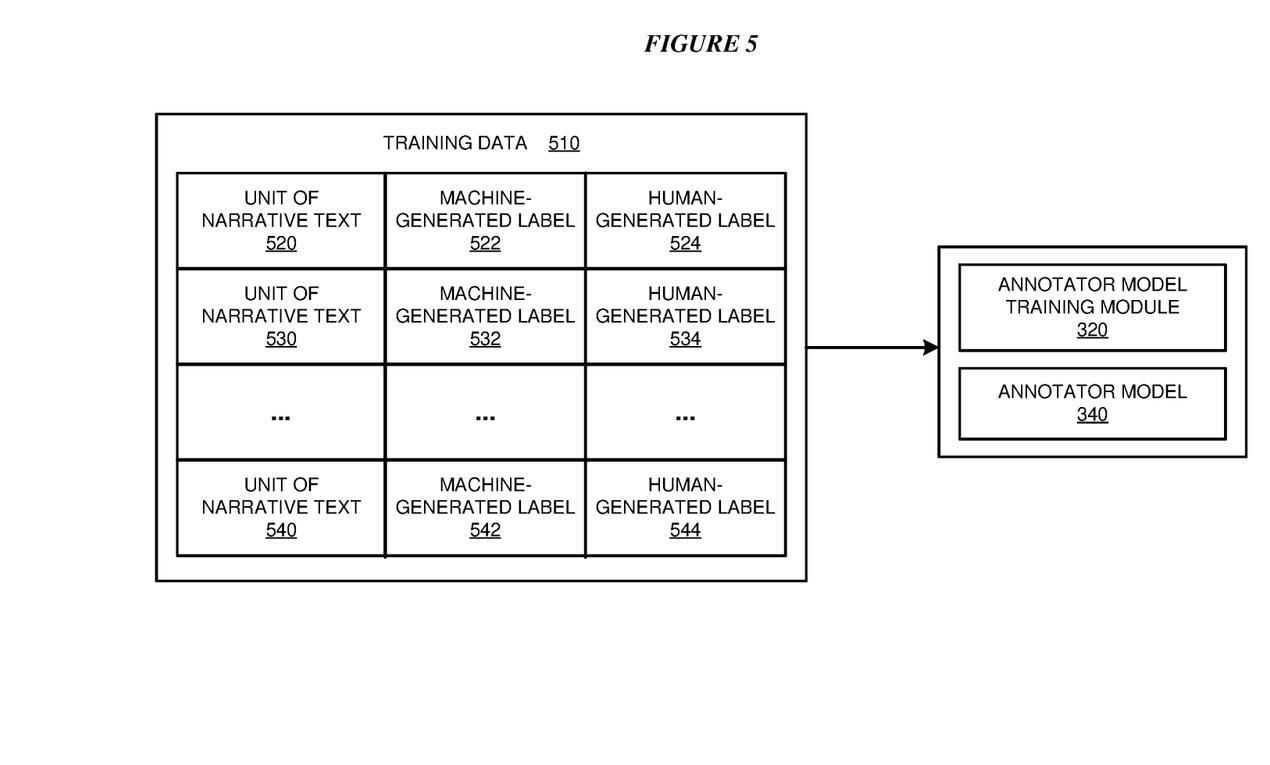
FIG. 5 depicts more detail of an example configuration for cross-subject model-generated training data for relation extraction modeling in accordance with an illustrative embodiment.

With reference to FIG. 5, this figure depicts more detail of an example configuration for cross-subject model-generated training data for relation extraction modeling in accordance with an illustrative embodiment. Annotator model training module 320 and annotator model 340 are the same as annotator model training module 320 and annotator model 340 in FIG. 3.

Annotator model training module 320 uses training data 510, produced by annotator training data generation module 310 in FIG. 3, to train annotator model 340. Training data 510 for a sentence of narrative text includes unit of narrative text 520, unit of narrative text 530, and unit of narrative text 540. Unit of narrative text 520 has corresponding human-generated label 524 and corresponding machine-generated label 522. Unit of narrative text 530 has corresponding human-generated label 534 and corresponding machine-generated label 532. Unit of narrative text 540 has corresponding human-generated label 544 and corresponding machine-generated label 542. Training data 510 also includes part of speech data, and syntactic role data for each of narrative text 520, unit of narrative text 530, and unit of narrative text 540 (not shown).

Figure 6:
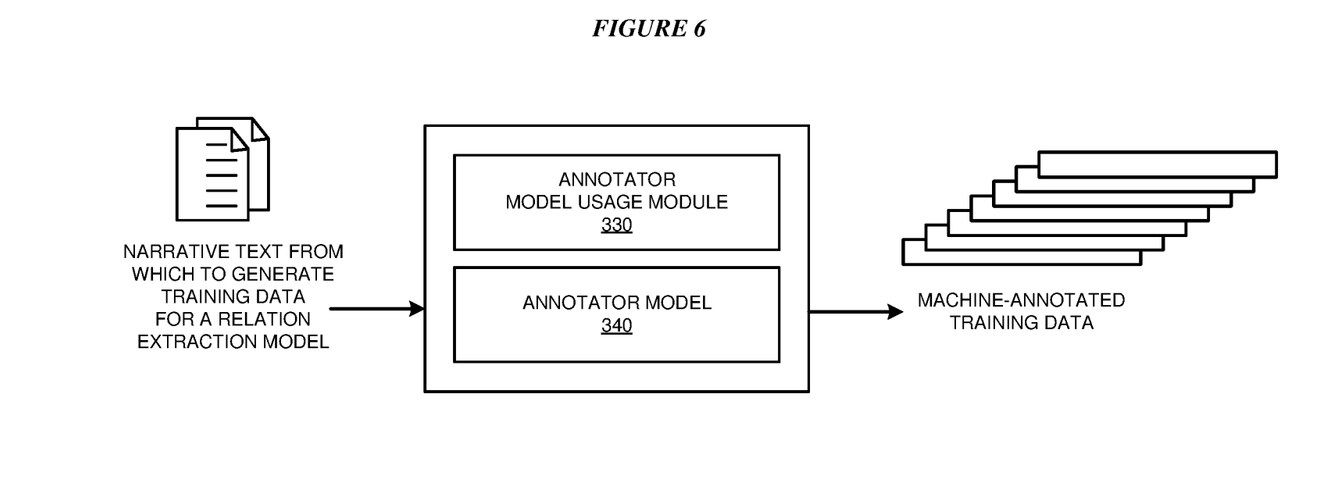
FIG. 6 depicts more detail of an example configuration for cross-subject model-generated training data for relation extraction modeling in accordance with an illustrative embodiment.

With reference to FIG. 6, this figure depicts more detail of an example configuration for cross-subject model-generated training data for relation extraction modeling in accordance with an illustrative embodiment. Annotator model usage module 330 and annotator model 340 are the same as annotator model usage module 330 and annotator model 340 in FIG. 3.

Annotator model usage module 330 uses annotator model 340, once trained, to produce machine-annotated training data from input narrative text. The machine-annotated training data can then be used to train a relation extraction model. The input narrative text need not be from the same knowledge domain as the training data used in training annotator model 340.

Figure 7:
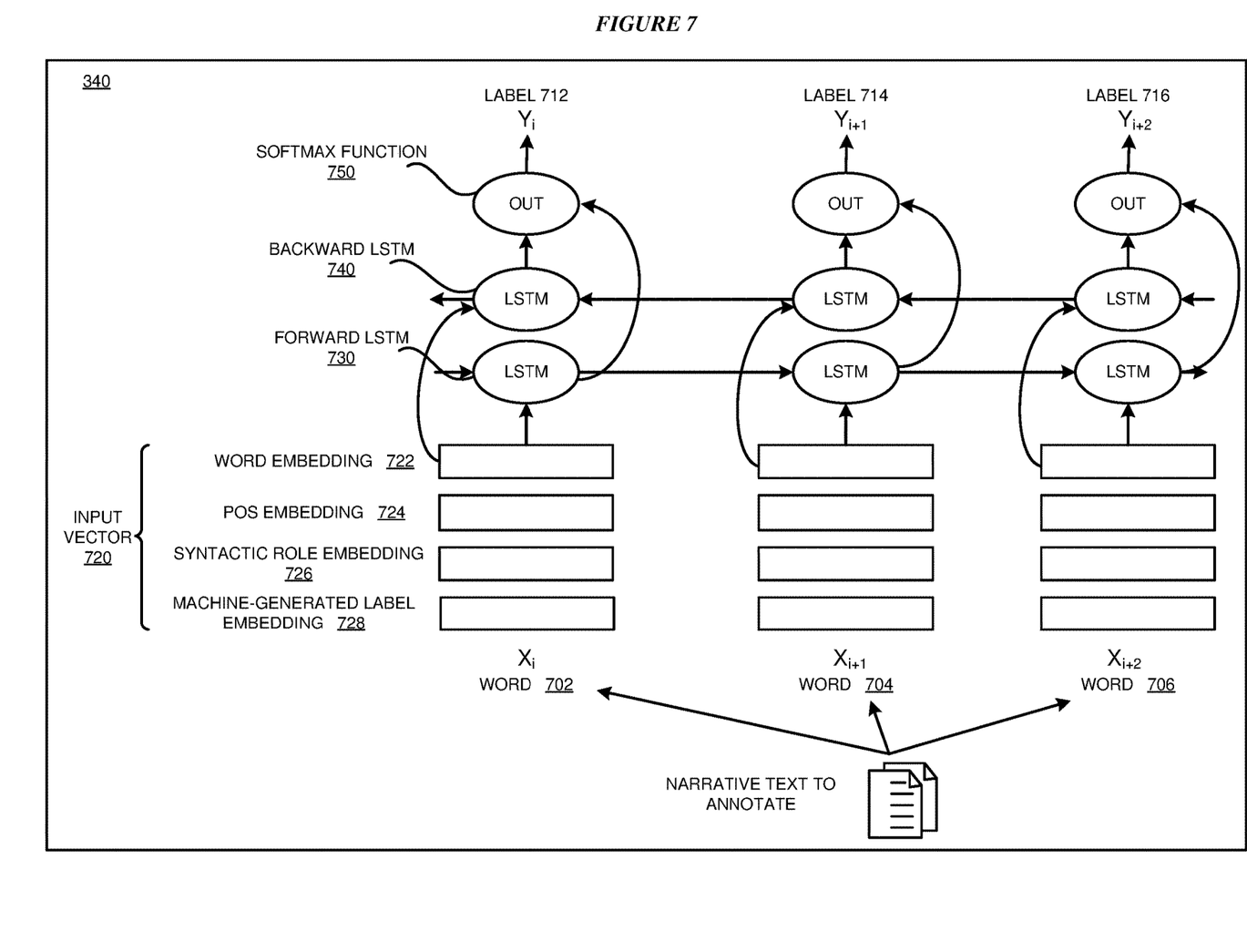
FIG. 7 depicts more detail of an example configuration for cross-subject model-generated training data for relation extraction modeling in accordance with an illustrative embodiment.

With reference to FIG. 7, this figure depicts more detail of an example configuration for cross-subject model-generated training data for relation extraction modeling in accordance with an illustrative embodiment. In particular, FIG. 7 depicts more detail of annotator model 340 in FIG. 3.

Annotator model 340 takes, as input, narrative text to annotate. The narrative text includes word 702, word 704, and word 706, which are adjacent words within a sentence.

In particular, annotator model 340 takes, as input, input vector 720 corresponding to word 702. Input vector 720 includes four components, summed together: word embedding 722, part of speech (POS) embedding 724, syntactic role embedding 726, and machine-generated label embedding 728.

Input vector 720 feeds into forward LSTM 730. The output of forward LSTM 730 feeds into an adjacent forward LSTM for use in assessing word 704. The output of forward LSTM 730 also feeds into softmax function 750. Input vector 720 also feeds into backward LSTM 740. Backward LSTM 740 also receives input from an adjacent backward LSTM for use in assessing an impact of word 704 and word 706 on word 702. The output of backward LSTM 740 also feeds into softmax function 750. Softmax function 750 produces, as output, a set of probabilities, each probability corresponding to a likelihood that word 702 is functioning as an entity, relation, or neither within the input sentence. The highest probability output of softmax function 750 is taken as label 712 corresponding to word 702, provided highest probability output is also above a threshold. In a similar fashion, annotator model 340 produces label 714 corresponding to word 704, and produces label 716 corresponding to word 706.

Figure 8:
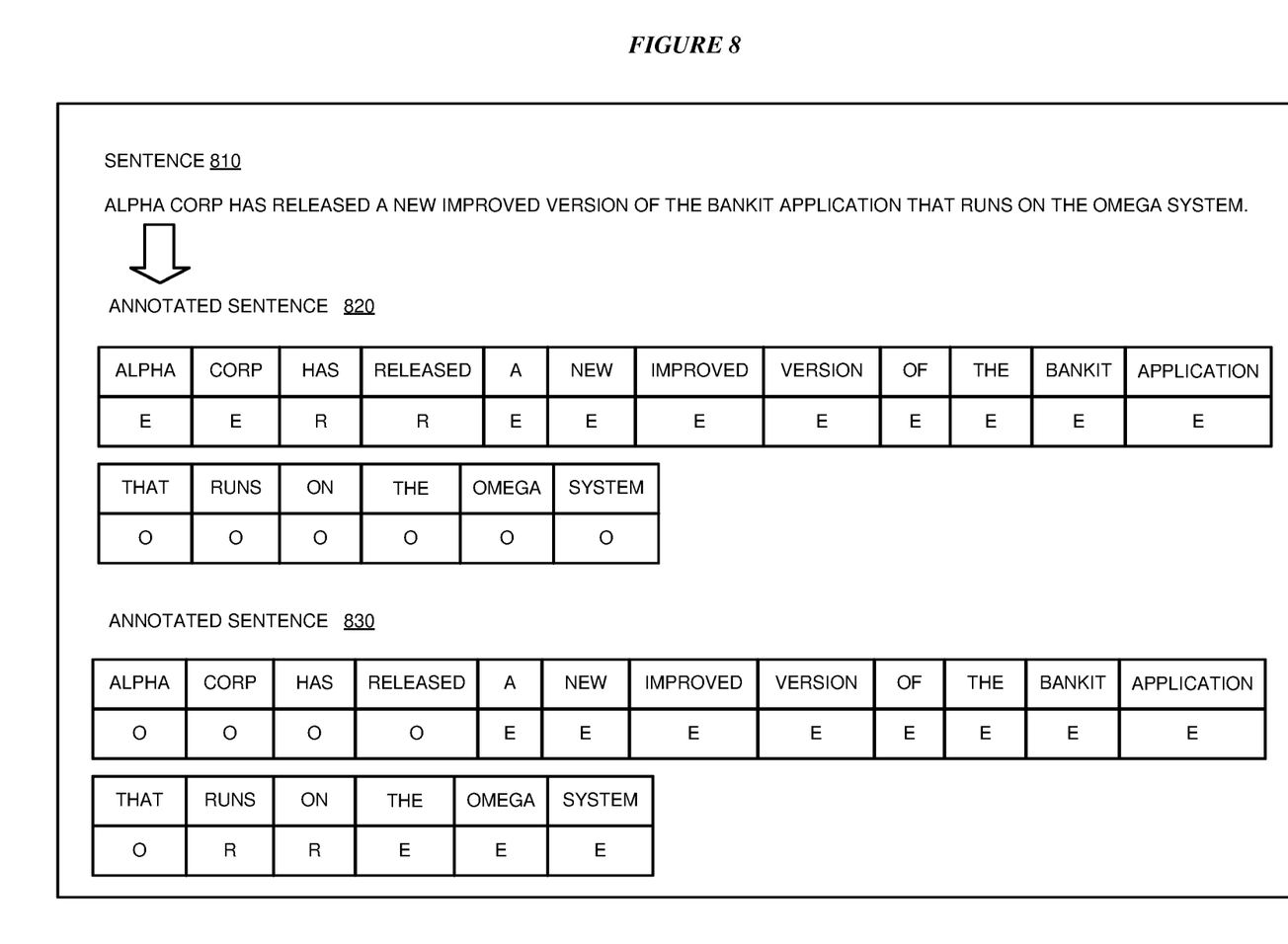
FIG. 8 depicts an example of generating cross-subject model-generated training data for relation extraction modeling in accordance with an illustrative embodiment.

With reference to FIG. 8, this figure depicts an example of generating cross-subject model-generated training data for relation extraction modeling in accordance with an illustrative embodiment. In particular, FIG. 8 depicts results of using annotator model 340 in FIG. 3 once annotator model 340 has been trained.

Trained annotator model 340 takes, as input, sentence 810: "Alpha Corp has released a new improved version of the BankIt application that runs on the Omega system." Model 340 identifies "has released" as a relation within the sentence and labels each word of the phrase with an R, for relation. Model 340 determines that the relation operates on two entities, "Alpha Corp" and "a new improved version of the BankIt application". Accordingly, model 340 labels each word of each entity phrase with an E, for entity. Because the remainder of the words within the sentence do not participate in the relation, model 340 labels each remaining word of the sentence with an O, for other. Annotated sentence 820 shows the resulting set of labels.

Model 340 also identifies, from sentence 810, a different relation—"runs on". Accordingly, model 340 labels each word of the relation phrase with an R. Model 340 determines that this relation operates on two entities, "a new improved version of the BankIt application" and "the Omega system". Accordingly, model 340 labels each word of each entity phrase with an E. Because the remainder of the words within the sentence do not participate in the relation, model 340 labels each remaining word of the sentence with an P, for other. Annotated sentence 830 shows the resulting set of labels.

Figure 9:
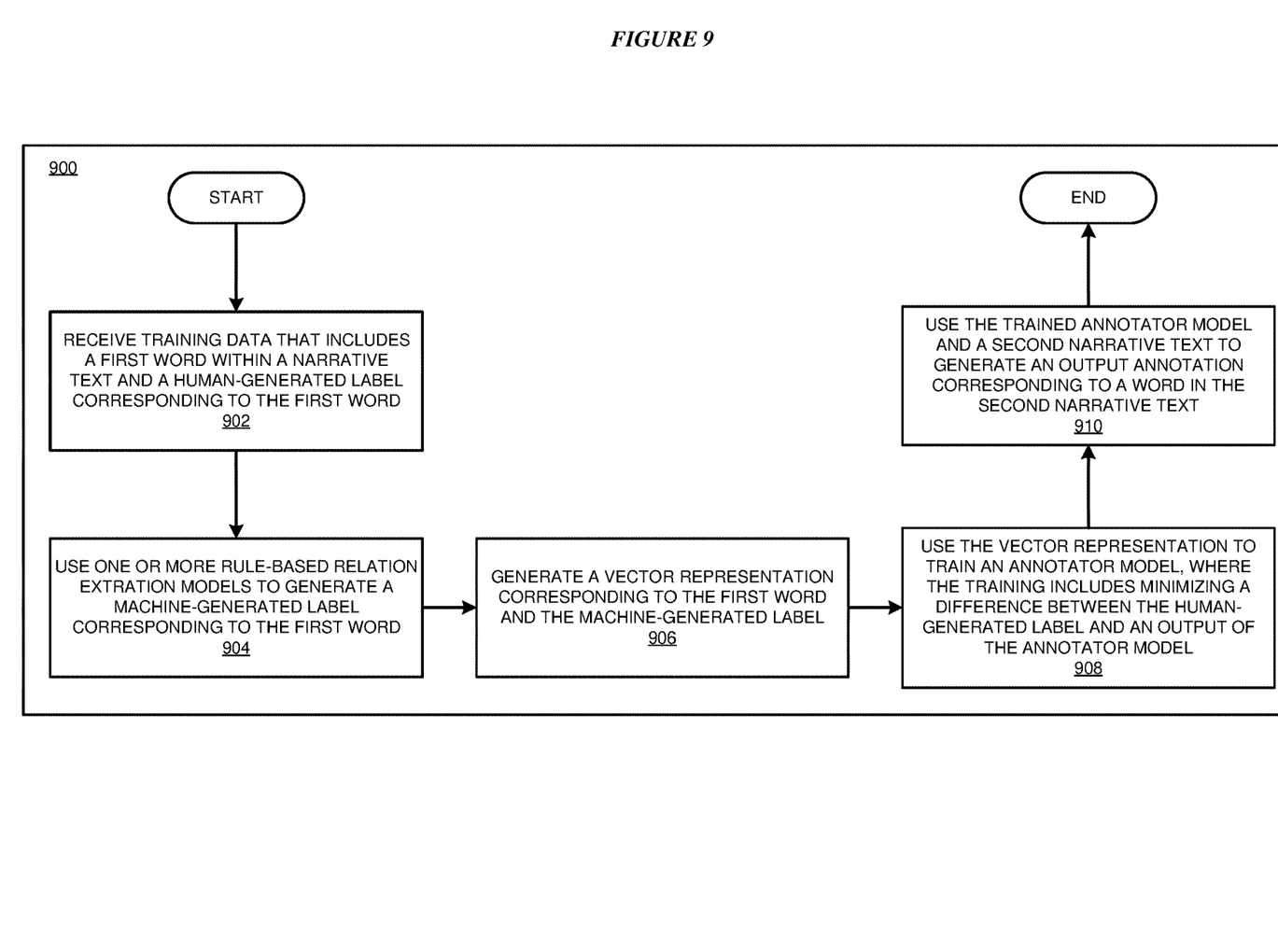
FIG. 9 depicts a flowchart of an example process for cross-subject model-generated training data for relation extraction modeling in accordance with an illustrative embodiment.

With reference to FIG. 9, this figure depicts a flowchart of an example process for cross-subject model-generated training data for relation extraction modeling in accordance with an illustrative embodiment. Process 900 can be implemented in application 300 in FIG. 3.

In block 902, the application receives training data, divided into sentences. The application processes a narrative sentence at a time. For each sentence, the training data includes a first word and a human-generated label corresponding to the first word. In block 904, the application uses one or more rule-based relation extraction models to generate a machine-generated label corresponding to the first word. In block 906, the application generates a vector representation corresponding to the first word and the machine-generated label. In block 908, the application uses the vector representation to train an annotator model. Training includes minimizing a difference between the human-generated label and an output of the annotator model. In block 910, the application uses the trained annotator model and a second narrative text to generate an annotation corresponding to a word in the second narrative text. Then the application ends.

Thus, a computer implemented method, system or apparatus, and computer program product are provided in the illustrative embodiments for cross-subject model-generated training data for relation extraction modeling and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   constructing a first vector representation, the first vector representation representing a first word within a first narrative text and a machine-generated label corresponding to the first word, the machine-generated label comprising an output of a rule-based relation extraction model, the rule-based relation extraction model comprising a set of rules specific to a first knowledge domain, the machine-generated label generated according to a labelling scheme;
   training, using the first vector representation, an annotator model, the annotator model configured to produce a set of probabilities, each probability in the set of probabilities representing a probable output annotation corresponding to a word within a narrative text, the training comprising minimizing a difference between a first human-generated label corresponding to the first word and a first probable output annotation corresponding to the first word, the first human-generated label and the first probable output annotation conforming to the labelling scheme, the training generating a trained annotator model; and
   generating, using the trained annotator model and a second narrative text associated with a second knowledge domain, second training data conforming to the labelling scheme, the second training data being usable to train a relation extraction model to label relations in a third narrative text according to the labelling scheme, the third narrative text associated with the second knowledge domain.

2. The method of claim 1, further comprising:
   constructing a first set of training data, the first set of training data comprising the first word, a first label corresponding to the first word, and a second label corresponding to the first word, wherein at least one of the first label and the second label is machine-generated.

3. The method of claim 2, wherein the machine-generated label comprises an output of a first rule-based relation extraction model and a second rule-based relation extraction model.

4. The method of claim 1, wherein the first vector representation comprises a concatenation of a set of vector representations.

5. The method of claim 4, wherein the concatenation comprises a vector representation of the first word.

6. The method of claim 4, wherein the concatenation comprises a vector representation of a part of speech corresponding to the first word.

7. The method of claim 4, wherein the concatenation comprises a vector representation of a syntactic role corresponding to the first word.

8. The method of claim 4, wherein the concatenation comprises a vector representation of the machine-generated label.

9. The method of claim 4, wherein the concatenation comprises a vector representation of the first word, a vector representation of a part of speech of the first word, a vector representation of a syntactic role of the first word, a vector representation of the machine-generated label, and a vector representation of a context of the first word.

10. The method of claim 1, wherein the first probable output annotation comprises a highest probability in the set of probabilities, the highest probability being above a threshold probability.

11. A computer usable program product comprising one or more computer-readable storage devices, and program instructions stored on at least one of the one or more storage devices, the stored program instructions comprising:
program instructions to construct a first vector representation, the first vector representation representing a first word within a first narrative text and a machine-generated label corresponding to the first word, the machine-generated label comprising an output of a rule-based relation extraction model, the rule-based relation extraction model comprising a set of rules specific to a first knowledge domain, the machine-generated label generated according to a labelling scheme;
program instructions to train, using the first vector representation, an annotator model, the annotator model configured to produce a set of probabilities, each probability in the set of probabilities representing a probable output annotation corresponding to a word within a narrative text, the training comprising minimizing a difference between a first human-generated label corresponding to the first word and a first probable output annotation corresponding to the first word, the first human-generated label and the first probable output annotation conforming to the labelling scheme, the training generating a trained annotator model; and
program instructions to generate, using the trained annotator model and a second narrative text associated with a second knowledge domain, second training data conforming to the labelling scheme, the second training data being usable to train a relation extraction model to label relations in a third narrative text according to the labelling scheme, the third narrative text associated with the second knowledge domain.

12. The computer usable program product of claim 11, further comprising:
program instructions to construct a first set of training data, the first set of training data comprising the first word, a first label corresponding to the first word, and a second label corresponding to the first word, wherein at least one of the first label and the second label is machine-generated.

13. The computer usable program product of claim 12, wherein the machine-generated label comprises an output of a first rule-based relation extraction model and a second rule-based relation extraction model.

14. The computer usable program product of claim 11, wherein the first vector representation comprises a concatenation of a set of vector representations.

15. The computer usable program product of claim 14, wherein the concatenation comprises a vector representation of the first word.

16. The computer usable program product of claim 11, wherein the stored program instructions are stored in a computer readable storage device in a data processing system, and wherein the stored program instructions are transferred over a network from a remote data processing system.

17. The computer usable program product of claim 11, wherein the stored program instructions are stored in a computer readable storage device in a server data processing system, and wherein the stored program instructions are downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct a first vector representation, the first vector representation representing a first word within a first narrative text and a machine-generated label corresponding to the first word, the machine-generated label comprising an output of a rule-based relation extraction model, the rule-based relation extraction model comprising a set of rules specific to a first knowledge domain, the machine-generated label generated according to a labelling scheme;
program instructions to train, using the first vector representation, an annotator model, the annotator model configured to produce a set of probabilities, each probability in the set of probabilities representing a probable output annotation corresponding to a word within a narrative text, the training comprising minimizing a difference between a first human-generated label corresponding to the first word and a first probable output annotation corresponding to the first word, the first human-generated label and the first probable output annotation conforming to the labelling scheme, the training generating a trained annotator model; and
program instructions to generate, using the trained annotator model and a second narrative text associated with a second knowledge domain, second training data conforming to the labelling scheme, the second training data being usable to train a relation extraction model to label relations in a third narrative text according to the labelling scheme, the third narrative text associated with the second knowledge domain.

\* \* \* \* \*